No. 872,320. PATENTED DEC. 3, 1907.
L. F. ADT.
SPRING FOR EYEGLASSES.
APPLICATION FILED MAR. 6, 1905.
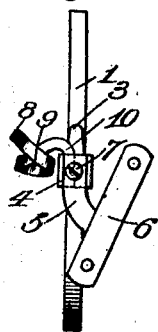
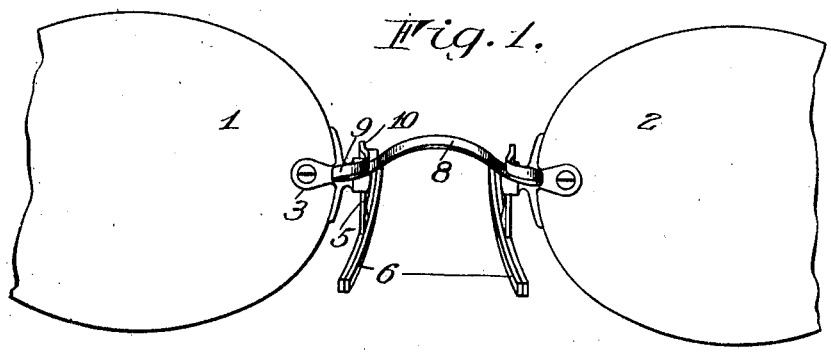
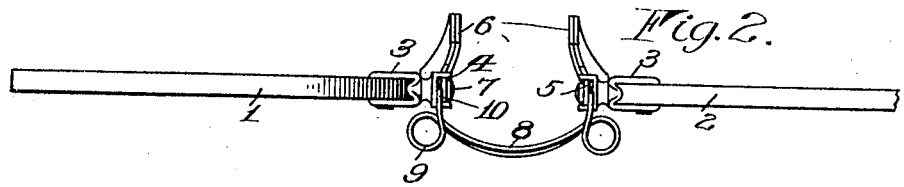
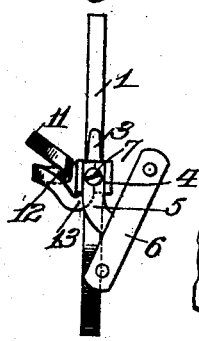
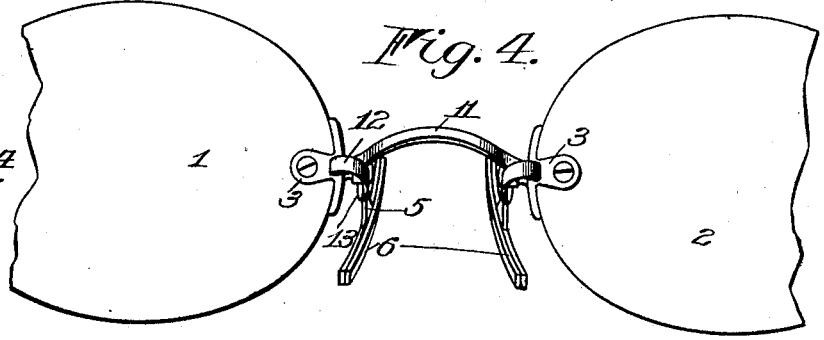
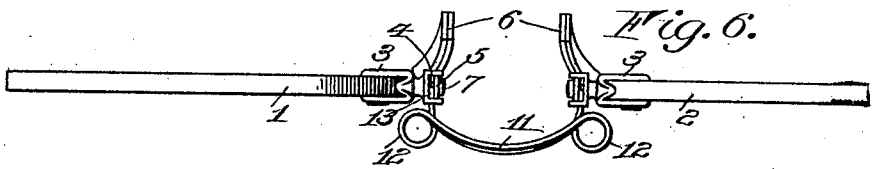
Witnesses
Walter B. Payne
Clarence A. Bateman
Inventor
Leo F. Adt
By
his Attorney

UNITED STATES PATENT OFFICE.

LEO F. ADT, OF TROY, NEW YORK.

SPRING FOR EYEGLASSES.

No. 872,320. Specification of Letters Patent. Patented Dec. 3, 1907.

Application filed March 6, 1905. Serial No. 248,426.

*To all whom it may concern:*

Be it known that I, LEO F. ADT, of Troy, in the county of Rensselaer and State of New York, have invented certain new and useful Improvements in Springs for Eyeglasses; and I do hereby declare the following to be a full, clear, and exact description of the same, reference being had to the accompanying drawings, forming a part of this specification, and to the reference-numerals marked thereon.

My present invention relates to improvements in eyeglasses, and the purpose of my invention is to provide a spring of the kind adapted for use in connection with eyeglasses wherein the lenses are tilted in a horizontal plane in applying and removing them from the wearer's nose, my present improvements enabling springs of this kind to be applied to the common posts having vertically-extending seats for the attaching portions of the spring and guards, whereby ample separation of the nose guards is secured while there are no tendencies to deflect the lenses out of a horizontal plane.

To these and other ends the invention consists of certain improvements and combinations of parts all as will be hereinafter more fully pointed out in the claims at the end of the specification.

In the drawing: Figures 1, 2 and 3 represent respectively a front elevation, plan view and transverse sectional view of a pair of eyeglasses, showing a spring constructed in accordance with my invention applied thereto and Figs. 4, 5 and 6 represent respectively a front elevation, plan view and transverse sectional view of a pair of eyeglasses, showing a different form of spring embodying my improvements.

My present invention is designed as an improvement on the mounting shown and described in Letters Patent No. 766,570 granted to me August 2, 1904 and the purpose of the present invention is to provide a spring having the bends which are arranged forward of the plane of the lenses and which are provided with vertically-extending attaching arms which may be used in connection with the common posts or attaching devices having vertically-extending seats for the spring and guards, and in the drawings I have shown each form of the spring as applies to eyeglasses wherein 1 and 2 designate the lenses each provided with the attaching devices 3, the latter being of any desired form and provided with the vertically-extending seats 4. These seats are adapted to receive the vertically-extending shanks 5 of the guards 6, any desired form of which may be employed, the usual fastening screws 7 being employed for securing the shanks to the attaching device.

The spring embodying my improvements comprises in the form shown in Figs. 1, 2 and 3, the central arched portion 8 the ends of which extend outwardly, thence forwardly, inwardly, rearwardly and somewhat upwardly over the ends of the spring and the attaching device to form the coils 9, and finally downwardly to form a vertical attaching arm 10 which is properly arranged to enter the vertical seat 4 of the corresponding attaching device and is adapted to be secured therein by the fastening screw 7. By extending the attaching arms of the spring from the upper portion of the coils 9 and the ends of the connecting portion 8 from the lower portion thereof, the vertical height of the coils and of the bridge is decreased and the coils may be and preferably are located directly in front of the attaching devices in substantially the same horizontal plane, and the spring is attached to the lenses by the vertically-extending attaching arms 10 which constitute the extremities of the coils.

The spring shown in Figs. 3, 4 and 5 is provided with the arched central portion 11, and the coils 12 at the ends thereof which are formed by bending the outwardly-extending ends forwardly, inwardly, thence in a direction rearwardly and downwardly to pass beneath the ends of the arched portion of the spring and beneath the attaching devices and the extremities of these coils are finally extended upwardly to form the vertical attaching arms 13 which are properly arranged to enter the vertical seats 4 of the attaching devices from beneath.

In either form, the horizontal coils at the ends of the spring are located in substantially the same horizontal plane as their points of attachment to the lenses, and consequently when the lenses are manipulated to open the guards, the motion of the parts will be insured in a horizontal plane and there is no tendency to deflect the lenses out of the horizontal plane, and by using the vertically-extending attaching arms or a spring having the horizontally-yielding bends in its ends, the latter may be applied to guards having vertically-extending attaching shanks. These attaching ends may enter the seats of the attaching devices either from the top or bottom as may be desired, but it is generally preferable that they should enter from the top, for the coils will present a neater appearance as viewed from the front of the eyeglasses, and the attaching ends of the spring will extend above the attaching devices and therefore will not form an obstruction to the guard arms or other parts. It is also preferable to arrange the flat surfaces of the coils substantially parallel to the lenses, and to arrange the flat surface of the central portion of the spring at an angle to that of the coils, as this will insure the best action of the coils while they are the least conspicuous, while by arranging the flat surface of the spring at an angle to that of the coil, the spring may rest flatwise on the wearer's nose, and by arching the bridge even better results are secured, as the bridge will rest firmly on the nose and will hardly be visible.

I claim as my invention:

1. In eyeglasses, the combination with the lenses, and suitable attaching devices thereon, of a bridge spring having horizontally-arranged bends formed therein, and vertically-extending attaching arms on the spring having their attaching portions located in substantially the same horizontal plane as said bends.

2. In eyeglasses, the combination with the lenses and the attaching devices thereon having vertically-arranged seats formed therein, of a spring having horizontally-yielding bends arranged in front of the lenses and in substantially the same horizontal plane with the attaching devices, and vertically-extending attaching arms on the spring arranged in horizontal alinement with their respective bends, and secured in the correspondingly formed seats in the attaching devices.

3. In eyeglasses, the combination with the lenses and the attaching devices thereon having vertically-arranged seats therein, of a spring having bends formed near each end arranged in front of the attaching devices and in substantially the same horizontal plane with said devices, and vertically-extending attaching arms formed on the bridge and arranged to enter the correspondingly formed seats in the attaching devices.

4. In eyeglasses, the combination with the lenses, and the attaching devices thereon having vertically-arranged seats therein for the reception of the guards and spring, of a spring having horizontal bends formed therein substantially in the same horizontal plane with the attaching devices, and vertically-extending attaching arms formed on the spring and arranged to enter the correspondingly-arranged seats in the attaching devices.

5. In eyeglasses, the combination with the lenses, and the attaching devices thereon having vertically-extending seats formed therein for the attaching portions of the guards and spring, of a spring having horizontal coils formed therein and arranged forward of the lenses and in substantially the same horizontal plane with the attaching devices, the ends of the coils forming vertically-extending attaching arms arranged on a level with their respective coils and adapted to enter the correspondingly-arranged seats of the attaching devices.

6. In eyeglasses, the combination with the lenses, and the attaching devices thereon having vertically-extending seats formed therein for the attaching portions of the guards and spring, of a spring having horizontal coils formed therein the ends of which extend rearwardly and upwardly above the level of the attaching devices, and thence downwardly into the vertically-arranged seats of the attaching devices.

7. In eyeglasses, the combination with the lenses, and the attaching devices thereon having vertically-extending seats formed therein for the attaching portions of the guards and spring, of a spring having its ends bent forwardly, inwardly, rearwardly and upwardly, and downwardly into the vertically-formed seats in the attaching devices.

8. A spring for eyeglasses embodying the central connecting portion, the horizontal coils having portions of their convolutions arranged above the ends of said portions and the vertically-arranged attaching ends extending from the upper portions of the coils, said coils being adapted to be closed when the attaching ends of the spring are separated.

9. A spring for eyeglasses composed of flat sheet metal embodying the coils and the vertically extending attaching ends, the said ends and the forward and rear flat surfaces of the coils extending in substantially parallel planes and the central portion connecting the coils having the flat surfaces of the metal arranged at an angle to that of the coils.

10. In eyeglasses, the combination with the lenses and guards, of a spring connecting them composed of flat sheet metal having the coils each connected at one of its ends with a lens and adapted to be closed or wound when the guards are separated, the forward and rear flat surfaces of the metal of said coils being arranged in planes substantially parallel with the faces of the lenses, and the central portion connecting the coils having the flat surfaces of the metal inclined at an angle to those of the coils.

11. In eyeglasses, the combination with the lenses and guards, of a spring connecting them composed of flat sheet metal having the coils each connected at one of its ends with a lens and adapted to be closed or wound when the guards are separated, the forward and rear flat surfaces of the metal of said coils being arranged in planes substantially parallel with the faces of the lenses and the central portion connecting the coils being arched and having the flat surfaces of the metal arranged at an angle to those of the coils.

LEO F. ADT.

Witnesses:
F. F. CHURCH,
G. WILLARD RICH.